Figure 9:
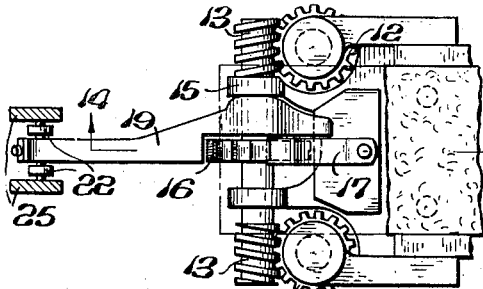

April 4, 1944.  C. A. WRIGHT  2,346,100
SHEAR
Filed April 2, 1942  3 Sheets-Sheet 1
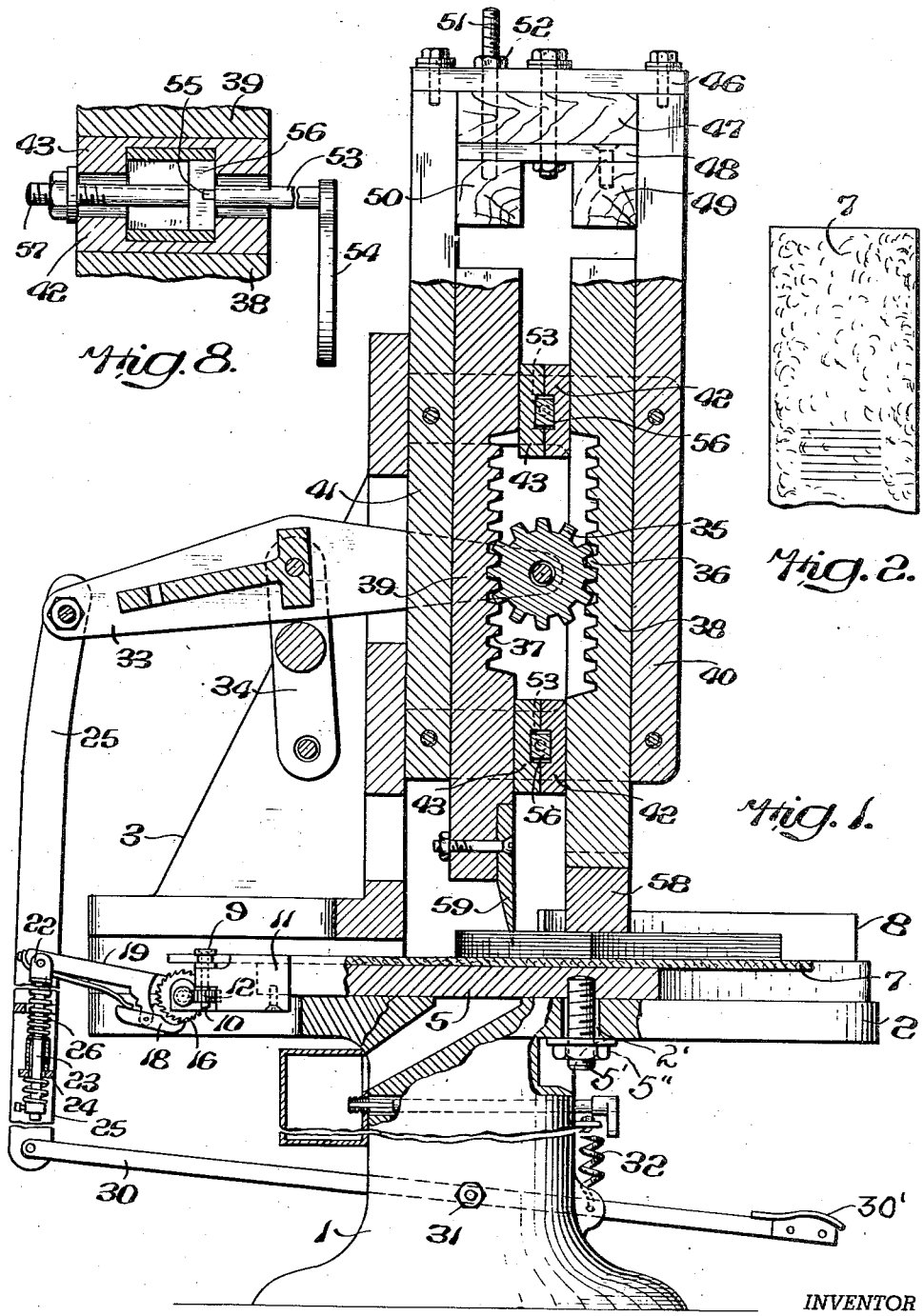
INVENTOR
CHARLES A. WRIGHT
BY
ATTORNEY

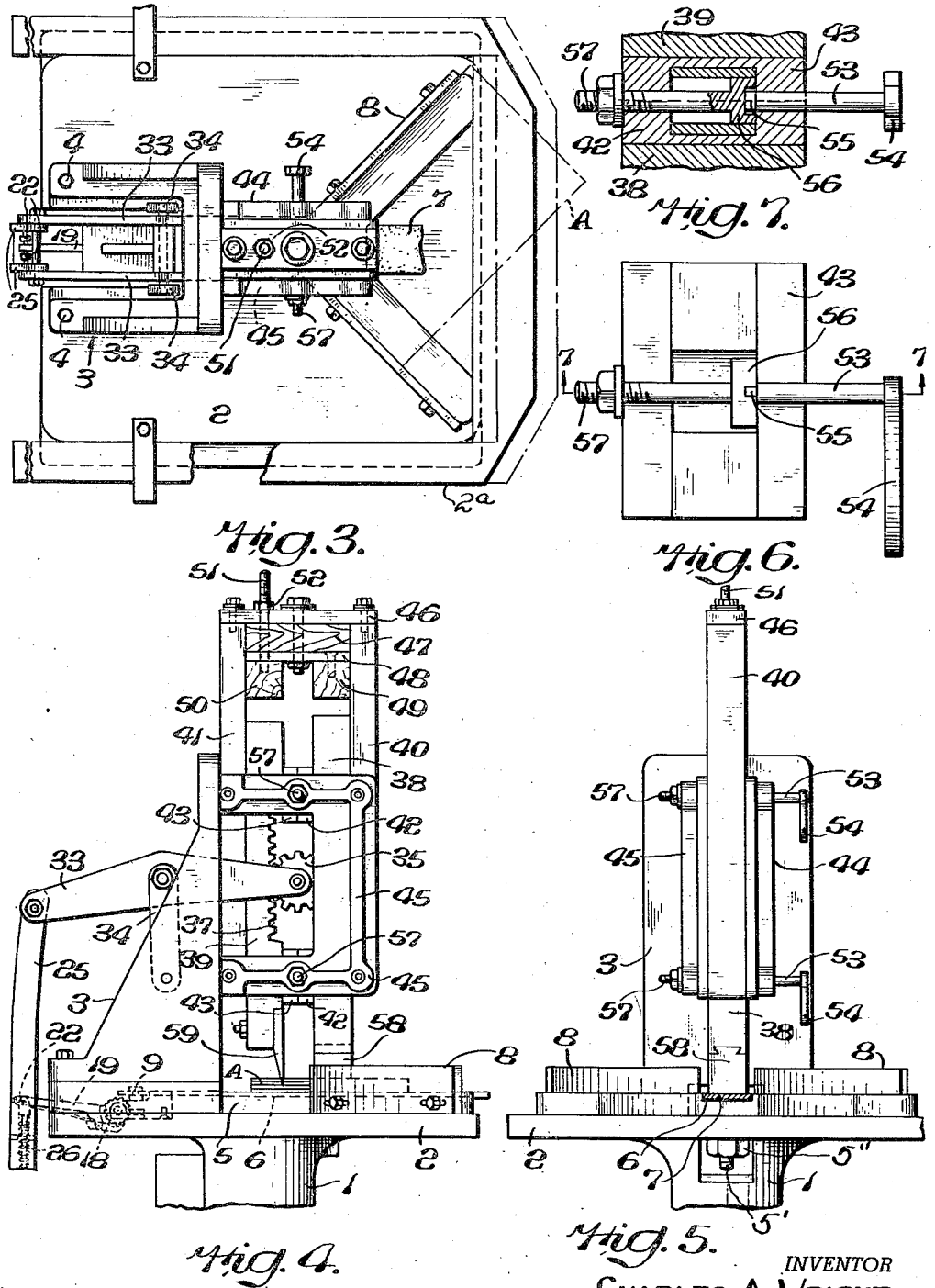

April 4, 1944. C. A. WRIGHT 2,346,100
SHEAR
Filed April 2, 1942 3 Sheets-Sheet 3

INVENTOR
Charles A. Wright
BY
ATTORNEY

Patented Apr. 4, 1944

2,346,100

UNITED STATES PATENT OFFICE 2,346,100

SHEAR

Charles A. Wright, Philadelphia, Pa.

Application April 2, 1942, Serial No. 437,406

8 Claims. (Cl. 164—51)

My invention is an improved shear which is particularly designed for making a sharp, clean cut through sheet material in stacks of various thicknesses, and the primary object of my invention is the provision of a simple machine which, without adjustment, will firmly grip stacks of sheets of varying thicknesses within the capacity of the machine and accurately and cleanly shear all the sheets in the stacks.

A further object of my invention is to provide an apparatus in which the work-clamp exerts pressure on the work proportionally to the varied resistances encountered by the cutter in shearing the work. A further object of my invention is to obviate the deleterious effects resulting from operating a cutter against a platen area which has been grooved by repeated strokes of the cutter. And a further object of my invention is to provide a work support having work guides fixed relatively to one another: the work support and guides being movable as a unit relatively to the clamp and cutter so that sheets abutting the guides may be sheared along different lines.

In the preferred embodiment of my invention, a clamp and a cutter are moved toward a platen, and when the clamp has gripped a stack of work, the cutter is moved relatively to the clamp, through the work, and against a platen which is preferably moved step by step so as to present a fresh surface beneath the cutter at each stroke thereof. The pressure of the clamp on the work is automatically augmented in exact ratio to the varied resistances met by the cutter in passing through the work, whether the cutter be sharp or dull.

The clamp and the cutter are mounted on carriers each including a toothed section or rack. The racks mesh with a pinion which lies between them and is rotatably mounted on an oscillatory arm operable from a treadle or other suitable source of power. The oscillations of the oscillatory arm reciprocate the pinion, and, therethrough, the carriers of the clamp and cutter. But when the movement of one of the carriers is stopped, as, for instance by the engagement of the clamp with the work, the continued movement of the oscillatory arm results in the rotation of the pinion by the stationary rack and consequent movement of the free rack to move the cutter relatively to the clamp. When the resistance to the advance of the cutter increases, the resultant of the forces transmitted through the pinion imparts greater pressure to the clamp.

The platen preferably comprises a sheet of fibrous material which is moved step by step beneath the clamp and cutter, when they are elevated, by feed rollers engaging edges of the platen and actuated through suitable worm gearing and intermittent clutch mechanism from the source of power which operates the carriers for the clamp and cutter.

The platen and platen operating mechanism are preferably carried on an adjustable work holder having guides permanently mounted thereon at an angle of ninety degrees to one another and having spaced ends through which the corners of the sheets project into cutting position.

Figure 10:
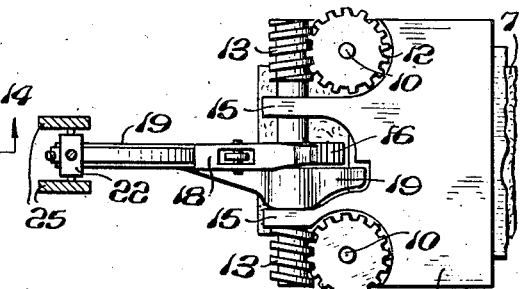
Figure 11:
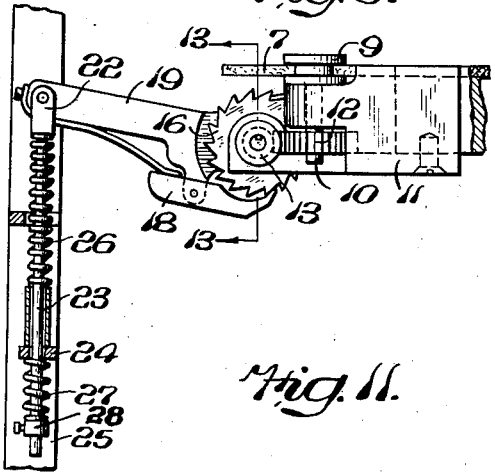
Figure 12:
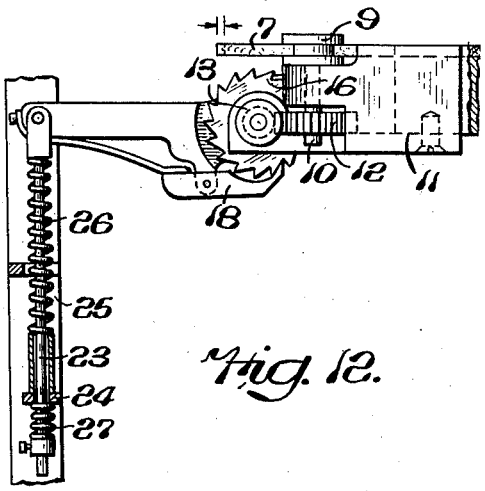
Figure 13:
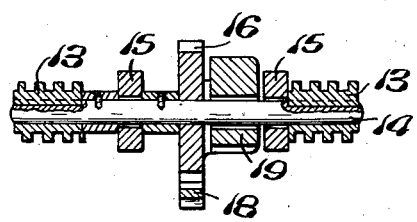
Figure 14:
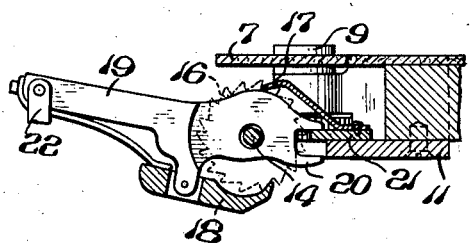

The characteristic features and advantages of my improvements will further appear from the following description and the accompanying drawings in illustration thereof:

In the drawings, Fig. 1 is a vertical, part sectional, elevation of a machine embodying my invention; Fig. 2 is a fragmentary plan view of a section of fibrous platen which is complementary to the sheet cutter and clamp in the operation of my improved apparatus; Fig. 3 is a top plan view of the machine shown in Fig. 1; Fig. 4 is a side elevation of the principal parts of the machine shown in Fig. 1; Fig. 5 is a front elevation of the machine as shown in Fig. 3; Fig. 6 is a detached front elevation of a spacer block and cam mechanism providing take-up for wear; Fig. 7 is a fragmentary sectional view of a spacer and adjoining slides taken in a plane indicated by the line 7—7 of Fig. 6; Fig. 8 is a transverse sectional view similar to Fig. 7 with the spacer expanded; Fig. 9 is a fragmentary top plan view of the mechanism for advancing the platen, part of the latter being broken away; Fig. 10 is a bottom view of the mechanism shown in Fig. 9; Fig. 11 is a side elevation of the mechanism shown in Fig. 9; Fig. 12 is a side elevation similar to that shown in Fig. 11 but with the platen and mechanism advanced one step as compared with their positions in Fig. 11; Fig. 13 is a fragmentary sectional view of the feeding mechanism taken approximately on the line 13—13 of Fig. 11; and Fig. 14 is a fragmentary sectional view taken approximately on the line 14—14 of Fig. 9.

In the embodiment of my invention illustrated in the drawings, a base 1 supports a table 2 having an extensible frame 2a and a bifurcated elevated rear portion to which a flanged hollow stanchion 3 is secured by bolts 4. A work-holder, comprising a plate 5, is adjustably secured to the table 2 by a threaded bolt 5' which extends through an elongated slot 2' and has threaded thereon a clamping nut 5''. The work-holder contains a groove 6 for a movable and replaceable platen 7, which is preferably made from fibrous material so as not to dull the edge of the cutter hereinafter referred to. The platen extends longitudinally of the work holder and between the spaced ends of the adjustable flanged guides 8 which are fixed to the work holder at an angle of ninety degrees to one another to position a stack of sheets or filing folders A in desired position to be clamped and cut as hereinafter described.

The platen 7 is advanced step by step beneath the sheets A by the engagement of circumferentially grooved feed rollers 9 with vertical edges of the platen. The rollers are fixed to spindles 10, which are journalled in a bracket 11 on the work holder 5 and rotated step by step through pinions 12 on the spindles 10 and worms 13 splined on the shaft 14. The shaft 14 is journalled in bearings 15 of spaced arms of the bracket 11 and has fixed thereto a toothed ratchet wheel 16 which is prevented from rotating clockwise by a spring detent 17 fixed on the bracket 11. The ratchet wheel 16 is advanced step by step anti-clockwise by the action of a spring-pressed pawl 18 which is pivotally mounted on a rocket arm 19 journalled on the shaft 14. The throw of the arm 19 is limited by the engagement of its spaced fingers 20 with a stop 21 on the bracket 11.

The arm 19 has pivoted thereto a yoke 22 from which projects a rod 23 extending through a cylindrical bearing 24 on a reciprocable link 25. A compressed coiled spring 26 encircles the rod 23 between the yoke 22 and the top of the bearing 24 and a compressed coiled spring 27 encircles the end 23 between the bottom of the bearing 24 and an adjustable stop 28 fixed to the rod 23. Reciprocatory motions of the link 25 are yieldingly transmitted to the arm 19 through the cushioning springs 26 and 27. The ascent of the link 25 causes retraction of the pawl 18 over the ratchet 16 and the descent of the link 25 causes the advance of the pawl 18 to turn the ratchet 16 anti-clockwise and, through the intermediate mechanism, advance the platen 7 one step.

The lower end of the link 25 is pivotally connected with and is reciprocable by a foot treadle 30 fulcrumed by a bolt 31 on the base 1 and normally biased by a spring 32 to lower the link 25. The upper end of the link 25 is pivotally connected with and oscillates a walking beam or lever 33 which is pivotally mounted on a rockable fulcrum bar 34 which is pivotally mounted between the flanges of the stanchion 3.

The outer end of the walking beam 33 has a pinion 35 journalled therein and provided with teeth which mesh with the teeth of racks 36 and 37 of the slides 38 and 39 respectively. The slides 38 and 39 are vertically reciprocable in sideways formed by rails 40 and 41 and blocks 42 and 43 forming expansible spacers.

The rails 40 and 41 are bolted to frames 44 and 45 supported by the stanchion 3 and their tops are connected by a cross-head comprising blocks 46, 47 and 48. A fixed stop 49 is suspended from the block 48 and an adjustable stop 50 is suspended from a threaded bolt 51 passing through the cross-head and vertically adjustable by means of a nut 52.

Shafts 53 having handles 54 are journalled in the frame 44 and have rectangular ends forming keys 55 which engage in sockets in the cam heads 56 of bolts 57 journalled in the frame 45. When the handles 54 are turned, the cam heads 56 are rotated to expand the blocks 42 and 43 of the spacers to regulate the friction on the slides 38 and 39 and compensate for wear.

A detachable clamp 58 is connected through a dove-tailed joint with the bottom of the slide 38 and a cutter 59 is bolted to the lower end of the slide 39.

The spring 32 normally biases the clamp 58 and cutter 59 away from the platen 7 so that a stack of sheets A may be deposited on the work-holder 5 and platen 7 and abutted against the guides 8 with the corners of the sheets projecting beyond the guides, as shown in Figs. 1 and 3. By loosening the nut 5'' the work-holder 5 and parts mounted thereon are adjustable forward and backward to bring the work into desired position relatively to the cutter 59.

In the operation of the machine, the treadle 30' is depressed to rock the lever 30, elevate the link 25, rock the lever 33 and lower the pinion 35. The descent of the pinion carries with it the slides 38 and 39 which may move concurrently or one after the other until the progress of one or the other is impeded by an obstruction or unequal friction. When one slide is impeded, the other moves until there is a resistance to its movement equal to the impedance to the movement of the other and when both implements 58 and 59 engage the work, substantially equal pressures are applied thereto to effect shearing and holding of the work. That is to say, when the clamp 58 is stopped by its engagement with the stack A, the continued downward movement of the pinion 35 in mesh with the stationary rack 36 causes the anti-clockwise rotation of the pinion and the consequent application of force to the pinion 37 sufficient to drive the cutter 59 downward through the stack A and into the yielding platen 7. But if dulling of the cutter or toughness of the work impedes the movement of the cutter, then the clamp is more tightly pressed against the work to hold it.

Hence, after the clamp 58 and cutter 59 have engaged the work A, substantially equal forces are applied to these implements tending to move them toward the platen 7 regardless of the actual relative movements thereof toward the platen, since the pinion and racks act as equalizing mechanism distributing the forces transmitted through the lever 33 to the clamp and cutter proportionately to the relative impedance to the respective movements thereof offered by the work.

When the pressure on the treadle 30' is released, the spring 32 reverses the movements of the parts, so that the platen 7 is advanced one step through the pawl and ratchet, worm gearing, and feed rollers described and the slides 38 and 39 are elevated. On such upward movement, the slide 38 usually first contacts the stop 49. Continued upward movement of the pinion 35 along the stationary rack 36 causes the rotation of the pinion clockwise and the consequent elevation of the slide 39 against the stop 50.

While I have described my improvements in connection with a shear, other implements than a clamp 58 and cutter 59 may be attached to or formed integrally on the implement carriers formed by the slides 38 and 39 without departing from the principles of my invention as defined in the appended claims.

Having described my invention, I claim:

1. The combination with a platen, of a pair of implement carriers reciprocable toward and from said platen and including slidable toothed members, a rotatable toothed member meshing with said first named toothed members, and means separate from said slidable members for bodily moving said rotatable member and shifting it rectilinearly of the axis thereof and through such movement apply force moving both said first named toothed members bodily and relatively to one another.

2. The combination with slideways, of a pair of implement carriers resiprocable along said slideways and including slidable toothed members immovably connected with said carriers, a rotary pinion disposed between and having teeth concurrently meshing with said toothed members and a reciprocatory member with which said pinion is pivotally connected, said reciprocatory member moving said pinion bodily to move said carriers and said pinion turning on said oscillatory member to move one of said carriers relatively to the other when the latter is impeded.

3. The combination with slideways, of a pair of implement carriers reciprocable in said slideways, an expansible spacer disposed between said carriers and pressing them toward said slideways, means comprising a cam for expanding said spacer, and means comprising rack and pinion mechanism for operating said carriers.

4. The combination with a platen and a pair of slides reciprocable normally to said platen, of a rotary and reciprocable member engaging said slides for moving them bodily and relatively to one another, a step by step clutch for moving said platen, and link and lever mechanism connected with said member and with said clutch and moving said slides toward said platen on the movement of said link and lever mechanism in one direction and advancing said platen upon the movement of said link and lever mechanism in the opposite direction.

5. The combination with a platen and a slide reciprocable relatively thereto, of means for imparting movement to said platen and comprising feed rollers engaging edges of said platen, worm gearing connected with said feed rollers, pawl and ratchet mechanism connected with said worm gearing, a lever connected with and operating said pawl and ratchet mechanism, and means connected with said lever for operating said slide.

6. A shear comprising a table, a work-holder adjustable on said table and having a pair of guides disposed at right angles to one another and having spaced ends, a work-clamp movable toward said work holder between said guides, and a cutter movable toward said work-holder beyond said guides.

7. A shear comprising a work holder having work guides spaced from one another for the projection of work between them, a reciprocable cutter movable toward said work-holder against work projecting between said guides, a rotatable and bodily movable pinion for operating said cutter, and a rack engaging said pinion.

8. A shear comprising a platen, a cutter, a clamp and means for applying forces to said cutter and clamp tending to move them toward said platen and including equalizing mechanism distributing said forces between said clamp and cutter proportionately to the relative impedance to the movement thereof, said means including a lever having a pinion at one end thereof, a source of power at the other end thereof, and a movable fulcrum between said ends, and racks fixedly connected with said clamp and cutter and operable by the rocking of said lever and by the rotation of said pinion.

CHARLES A. WRIGHT.